United States Patent [19]

Schlueter

[11] Patent Number: 4,606,177
[45] Date of Patent: Aug. 19, 1986

[54] COTTON CLEANING STRUCTURE FOR A COTTON HARVESTER

[75] Inventor: Francis E. Schlueter, Des Moines, Iowa

[73] Assignee: Deere & Company, Moline, Ill.

[21] Appl. No.: 693,425

[22] Filed: Jan. 22, 1985

[51] Int. Cl.$^4$ ............................................. A01D 46/10
[52] U.S. Cl. ........................................... 56/30; 56/28; 56/16.5; 19/64.5
[58] Field of Search ................ 56/28, 30, 16.6, 327 R, 56/12.8, 13.3, 16.5; 19/64.5, 39

[56] References Cited

U.S. PATENT DOCUMENTS

| | | | |
|---|---|---|---|
| 2,741,888 | 4/1956 | Haneh et al. | 56/30 |
| 3,651,624 | 3/1972 | Bandemer | 56/28 |
| 3,964,242 | 6/1976 | Stone | 56/30 |
| 4,271,659 | 6/1981 | McConnell | 56/30 |
| 4,344,272 | 8/1982 | Gaudette et al. | 56/28 |
| 4,452,134 | 6/1984 | Muse | 56/30 |

FOREIGN PATENT DOCUMENTS

619141  7/1978  U.S.S.R. ................... 56/28

Primary Examiner—Robert Peshock
Assistant Examiner—John G. Weiss

[57] ABSTRACT

Bypass grate and door control structure for a cotton-cleaning machine mounted on a cotton harvester, and structure for spreading conveyed cotton uniformly across the width of the cleaning machine. A control linkage moves two grates, a door sheet, and an air door assembly in unison between cleaning and bypass mode positions. In the cleaning mode, cotton is directed downwardly from the air duct into the cleaning machine by the grates while air, fine dirt and trash are diverted through the grates and over the air door assembly away from the cotton basket. The cotton conveying duct and air nozzle are shaped to spread cotton uniformly across the upper portion of the duct, and diverging vane structure located above the cleaning machine distributes the downwardly directed cotton evenly across sawgrid type cleaners. An adjustable green boll opening below the grate structure permits heavy trash to drop from the conveying system to reduce gumming. In the bypass mode, cotton enters the basket directly from the cotton conveying duct.

33 Claims, 11 Drawing Figures

COTTON CLEANING STRUCTURE FOR A COTTON HARVESTER

BACKGROUND OF THE INVENTION

The present invention relates generally to cotton harvesters, and more specifically to cotton-cleaning structure for a mobile cotton harvester.

Cotton is typically harvested with either a spindle-type harvester or a stripper-type harvester. The spindle-type harvester provides a much cleaner harvested crop of cotton than does the stripper-type, but the stripper-type harvester is lower in cost, has a higher capacity and has a higher harvesting efficiency than the spindle-type. Because of the advantages of the stripper in many locations, its popularity has increased even though trash content of the harvested cotton may be as high as fifty percent since sticks, burrs, leaves, soil, weeds and other trash are easily conveyed into the receptacle along with the removed cotton. The cotton gins which process stripper-harvested cotton require elaborate cleaning systems, and the pollution caused by the high trash content of the harvested cotton is a problem. The ginning rate decreases as trash content increases. The high trash content results in higher transportation and cleaning costs which translate into reduced income for the cotton producer. The trash content of the stripped cotton also increases storage problems due to the higher moisture content of the uncleaned cotton.

To reduce the trash content of the harvested cotton, field-cleaning machines are available which are mounted on the frame of the cotton stripper. The machines include a cleaning cabinet with saw-grid type cleaners extending the width of the cabinet. Typically the cabinet is positioned between the rear of the cotton stripper cab and the front portion of the cotton stripper basket, and the air duct which conveys the cotton from the harvesting unit up to the basket is fitted with pivoting grate structure which either directs the cotton into the cleaning cabinet or alternately directly into the top forward portion of the basket. Cotton directed into the cleaner is distributed over channel saws which extend around cylinders rotatably mounted between the sides of the cabinet. As the cotton and trash are drawn around by the cylinders and impact against the grid bars, the trash tends to separate from the cotton. The cleaned cotton is doffed from the channel saws on the cylinders and is conveyed up to the basket through a rear duct.

The field-cleaning machine must be economical and must have sufficient capacity so that it does not severely limit the overall capacity of the cotton stripper and field-cleaning machine combination. Several problems exist with current field-cleaning machines for cotton strippers. A primary problem is the inability of such systems to economically and effectively distribute the cotton to be cleaned uniformly over the width of the cylinders. The maximum capacity of the field-cleaning machine can only be achieved if the cotton is uniformly distributed across the cylinders. Heretofore, however, such uniform distribution could not be achieved without relatively elaborate buffer chambers or spreading devices which not only add to the weight, complexity and expense of the system, but also require a relatively large amount of space on the harvester frame.

The spreading of the cotton across the width of the cleaning machine is also very dependent upon the conveying characteristics of the upwardly and rearwardly cotton conveying duct which feeds the input of the cleaning machine. Without a reasonably uniform distribution across the width of the duct near the input to the cleaning machine, proper distribution across the width of the machine is severely hindered.

Another problem with the previously available cleaning machines is lack of a convenient and economical system for bypassing the cleaner to permit full harvester capacity when the cleaning machine can not keep up with the stripper output. The amount of cotton entering the cleaning machine depends upon the rate of travel of the stripper and the yield of the cotton in the field being stripped, and is quite dependent upon the operator of the machine. Therefore, a bypass system should be convenient to control so the operator can change between modes of operation easily and effectively.

Gumming caused by green bolls entering the cleaning machine has been a continuing problem. Time-consuming cleaning operations must be performed regularly to keep the machine operaling effeciently if green bolls consistently reach the channel saws. Productivity of the cleaning machine is reduced as the amount of trash and green bolls which enters the machine increases.

SUMMARY OF THE INVENTION

It is therefore an object of the present invention to provide an improved field-cleaning machine for a cotton stripper. It is another object to provide such a machine which permits the stripper to be operated at or near its maximum capacity.

It is another object of the present invention to provide a frame-mounted cleaning machine with a compact cabinet and with economical and compact distributing structure which distributes the cotton to be cleaned uniformly across the width of the cabinet. It is a further object to provide such a machine which eliminates the need for bulky or complex surge chambers or distributing devices. It is yet a further object to provide such a machine which reduces gumming caused by green bolls entering the cleaning area and which increases productivity by reducing the amount of trash entering the cleaning machine.

It is another object of the present invention to provide a field-cleaning machine for a cotton stripper having a bypass system which permits full use of the harvester capacity when the cleaning machine becomes blocked or overloaded. It is yet a further object to provide such a bypass system which is easy and convenient to operate, and which does not obstruct cotton flow either when the system is in the bypass mode wherein cotton is conveyed directly to the cotton receptacle, or when the system is in the cleaning mode wherein the cotton is directed uniformly across the width of the cleaning cabinet.

It is yet another object of the present invention to provide a field-cleaning machine for a cotton harvester wherein the harvested cotton is uniformly distributed to the cleaning structure of the machine. It is yet another object to provide such a device having an air-conveying duct which provides uniform distribution of cotton within the duct as it is conveyed towards the cleaner. It is still another object to provide such a system wherein the input to the cleaning machine includes simple vane or fin structure for causing the cotton from the output of the cotton conveying duct to diverge uniformly across the width of the field-cleaning machine.

It is a further object of the invention to provide a simple and effective bypass system for a cotton-cleaning machine on a cotton harvester wherein in the cleaning mode, air and trash will be exhausted away from the receptacle.

A pair of movable grates located at the top of the conveying duct and an air door assembly located adjacent the output of the cleaning machine and adjacent the input to the cotton receptacle are connected for simultaneous pivoting about parallel transversely extending axes between a cleaning mode position wherein the cotton is directed to the input of the cleaning machine and the air door assembly opens the output of the cleaning machine into the input of the cotton receptacle, and a bypass mode position wherein the grates are raised and the air door assembly is lowered to a position to permit the cotton to flow directly into the cotton receptacle and bypass the cleaning machine. Two grates, a door panel located adjacent the cleaning machine input duct, and the air door assembly are controlled simultaneously by a single lever to quickly and easily change between the cleaning mode and the bypass mode. In the cleaning mode, the top of the air door assembly directs air and fine trash through a rear grate to reduce the amount of air and trash entering the receptacle. When the harvester is operated in heavy cotton conditions or at a high rate of ground speed, the cleaning machine can be bypassed by simply changing the position of the lever so that the full capacity of the stripper can be utilized. An air nozzle located above the lower end of the airconveying duct is structured to provide a substantially uniform distribution of the cotton in the duct. The duct itself is tapered outwardly and narrowed in the fore-and-aft direction to optimize cotton conveying capacity and spreading characteristics.

The cotton conveying structure opens in the downward direction upstream from the inlet duct of the cleaning machine, and panel structure located at the forward edge of the opening may be raised or lowered to adjust the amount of heavy material such as green bolls which falls through the opening. By properly positioning the panel structure, a high percentage of the green bolls may be effectively eliminated before they enter and gum up the cleaning machine.

These and other objects, features and advantages of the present invention will become apparent to those skilled in the art from the description which follows and from the drawings.

DESCRIPTION OF THE PREFERRED EMBODIMENT

Figure 1:
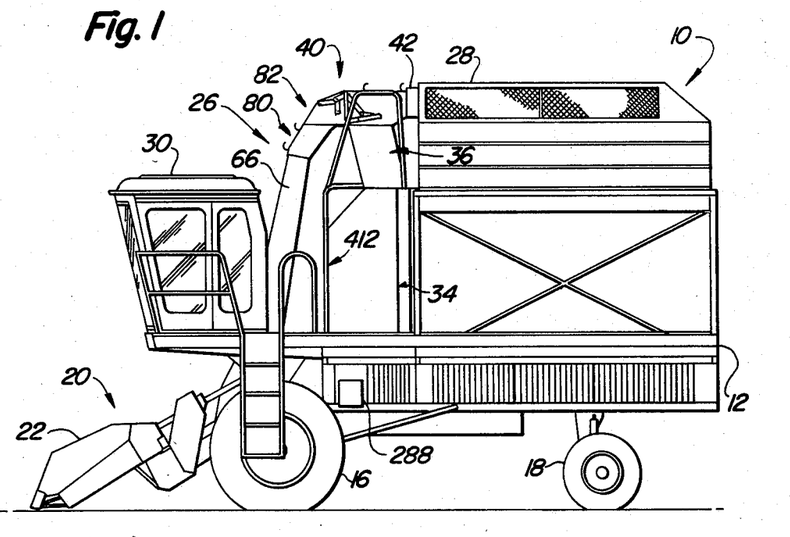
FIG. 1 is a side view of a cotton harvester with a cleaning machine mounted thereon.

Referring to FIG. 1, therein is shown a cotton stripper 10 having a fore-and-aft extending main frame 12 supported for forward movement over the ground by ground wheels 16 and 18. A transversely extending harvesting head assembly 20 is supported on the forward end of the main frame 12 and includes a plurality of transversely spaced stripping row units 22, each having conventional counterrotating brush-type stripper rolls (not shown) for brushing the cotton bolls from a row of cotton plants. Conveying structure 26 extends rearwardly and upwardly from the row units 22 to move the cotton from the row units to a receptacle 28. A cab 30 is mounted on the forward end of the main frame 12 above the head assembly 20.

The main frame 12 of the harvester 10 is extended in the fore-and-aft direction to accommodate a cleaning machine 34 ahead of the receptacle 28 and behind the cab 30. Connecting ductwork 36 extends between the upper end of the conveying structure 26 and the upper portion of the cleaning machine 34. Adjustable grate and door control structure 40 is located at the upper portion of the conveying structure 26 and is movable between a cleaning mode position wherein the cotton is directed from the conveying structure 26 into the ductwork 36 and cleaning machine 34, and a bypass mode position wherein the cotton from the conveying structure 26 is conveyed directly rearwardly into the receptacle 28 through an input 42.

Figure 9:
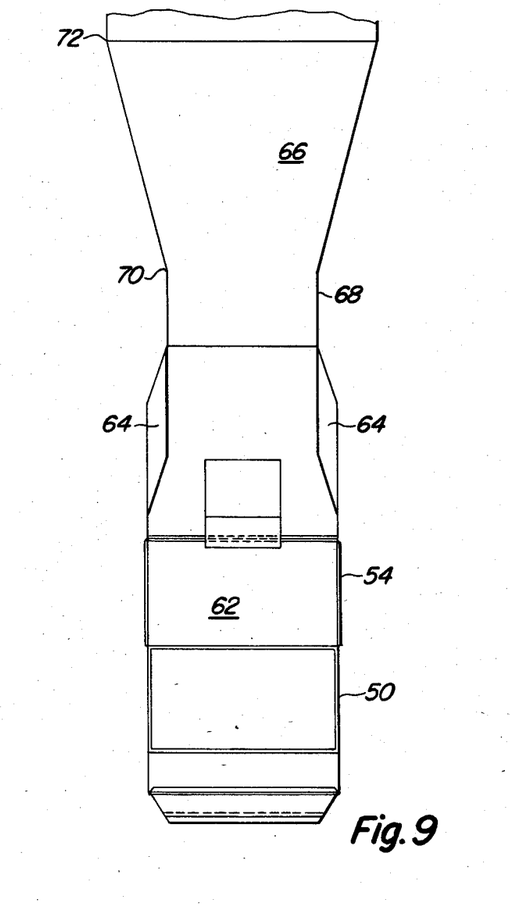
FIG. 9 is an enlarged rear elevation of the cotton conveying duct for the cotton stripper of FIG. 1.
Figures 10, 11:
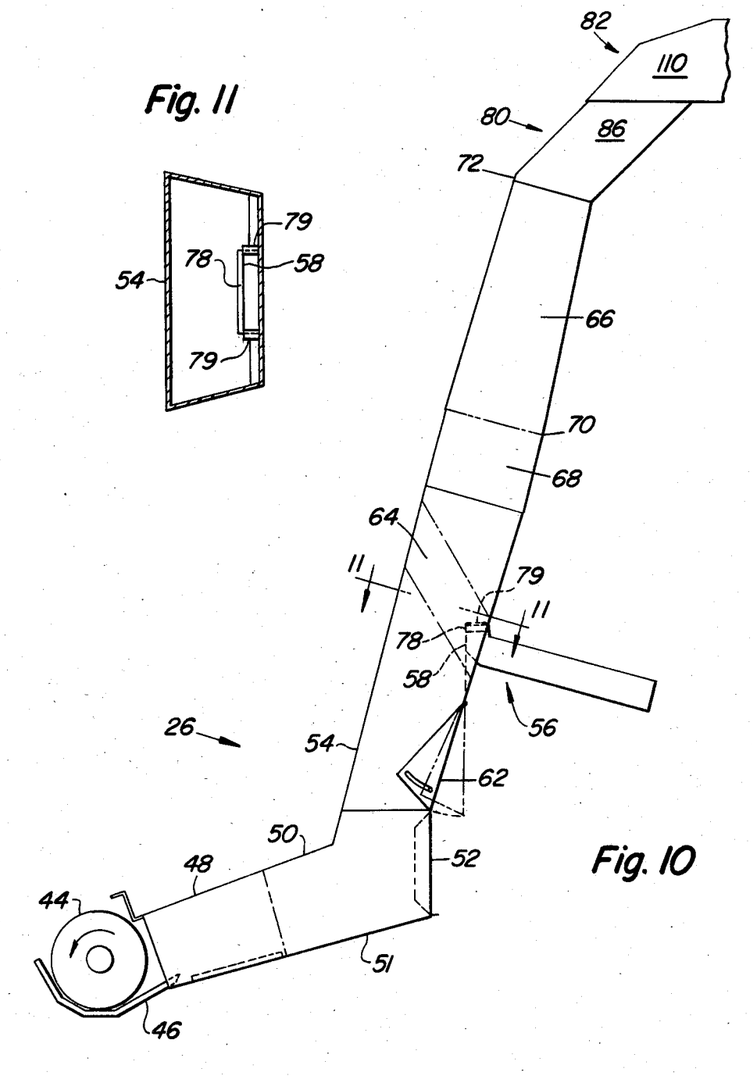
FIG. 10 is a left-hand side elevation of the conveying system utilized on the stripper of FIG. 1.
FIG. 11 is a view taken along lines 11—11 of FIG. 10.

Referring now to FIG. 10, the conveying structure 26 includes a cross auger 44 which extends transversely between the ends of the harvesting head assembly 20 and is rotated in the direction of the arrow to move the cotton harvested by the row units 22 toward a central location. The cross auger 44 includes a cross auger housing 46 which opens into a lower duct 48 at the central location. The duct 48 is connected to a separation duct 50 having an open bottom 51 and an adjustable rear wall 52. The separation duct 50 opens upwardly and rearwardly and is connected to an air induction chamber 54 which supports the forward end of an air nozzle and duct assembly 56 having an upwardly opening nozzle 58. An adjustable air bleed door 62 is pivotally connected to the lower end of the air induction chamber 54 just below the assembly 56. As best seen in FIG. 9, the air induction chamber 54 tapers inwardly in the fore-and-aft direction at locations 64 to provide a narrower duct cross section above the nozzle 58 as compared with the cross section below the nozzle. An upper duct section 66 includes a lower, straight sidewalled section 68 connected to the upper narrowed portion of the air induction chamber 54. At a location indicated generally at 70 the upper duct section 66 diverges transversely (FIG. 9) while at the same time narrowing in the fore-and-aft direction (FIG. 10). In the preferred embodiment, the taper at 64 decreases the width of the air induction chamber 54 approximately twenty percent from the lower end to the upper end. The width of the lower section 68 is approximately equal to the width of the upper end of the tapered section. The section 66 diverges outwardly in the upward direction from the location 70 to a width more than twice the width of the section 68 and slightly less than twice the width of the lower portion of the air induction chamber 54. The depth of the air induction chamber 54 remains fairly constant from its lower end to its upper end, and the depth of the upper end of the chamber 54 is equal to approximately seventy percent of the width of the section 68. As the upper duct section 66 widens (FIG. 9) the depth (FIG. 10) decreases by approximately twenty percent from the location 70 to a location 72 at the end of the taper.

The nozzle 58 of the air assembly 56 opens upwardly adjacent the back wall of the air induction chamber 54 near the lower end of the tapers 64. The air induction chamber 54 and the assembly 56 are generally of conventional construction; however, the nozzle 58 includes a front wall 78 which is straight and the sidewalls are flared outwardly at 79 to cause air to be directed more toward the front and sides of the duct than with conventional nozzle assemblies. The structures 78 and 79 provide a more uniform air flow in the upper duct section 66, which is substantially widened in the transverse direction and narrowed in the fore-and-aft direction over corresponding duct sections in previously available conveying structure for a stripper. The above-described structure has been found to provide a substantially uniform distribution of the conveyed cotton along the width of the upper duct section 66 adjacent the location 72. In the preferred embodiment, by way of example, the width of the lower portion of the air induction chamber 54 is approximately twenty-five inches, and the depth of the upper portion of the chamber 54 is approximately fourteen inches. The chamber 54 tapers to an upper end having a width of approximately twenty inches which corresponds to the width of the lower section 68. From the location 70, the upper duct section 66 tapers from a width of approximately twenty inches to a width of approximately forty-eight inches. At the same time the depth of the section 66 decreases from approximately fourteen inches at location 70 to approximately eleven inches at location 72.

The upper portion of the duct section 66 is connected to a grated upper connecting duct 80 which in turn is connected to a hood section 82 which supports the grate and door control structure 40. The connecting duct 80 and hood section 82 cooperate to substantially change the direction of flow of the cotton in the conveying structure 26.

The connecting duct 80 includes sidewalls 86 extending upwardly from the sidewalls of the upper duct section 66. Conventional grate structure 88, including closely spaced, rolled grate fingers 90 supported on a bracket assembly 92, generally closes the forwardly and upwardly directed opening of the connecting duct 80 to conveyed cotton while permitting fine trash and dirt to pass between the fingers 90. Adjustable sliding panel structure 96 extending upwardly from the rear wall of the duct section 66 between the sidewalls 86 generally closes the aft end of the connecting duct 80. The panel structure 96 includes a lower panel 98 fixed between the lower portions of the sidewalls 86, and an upper panel 102 having slotted flanges 104. The panel 102 has a rolled upper end 106 extending transversely the width of the conveying structure 26 in the hood section 82.

Figure 5:
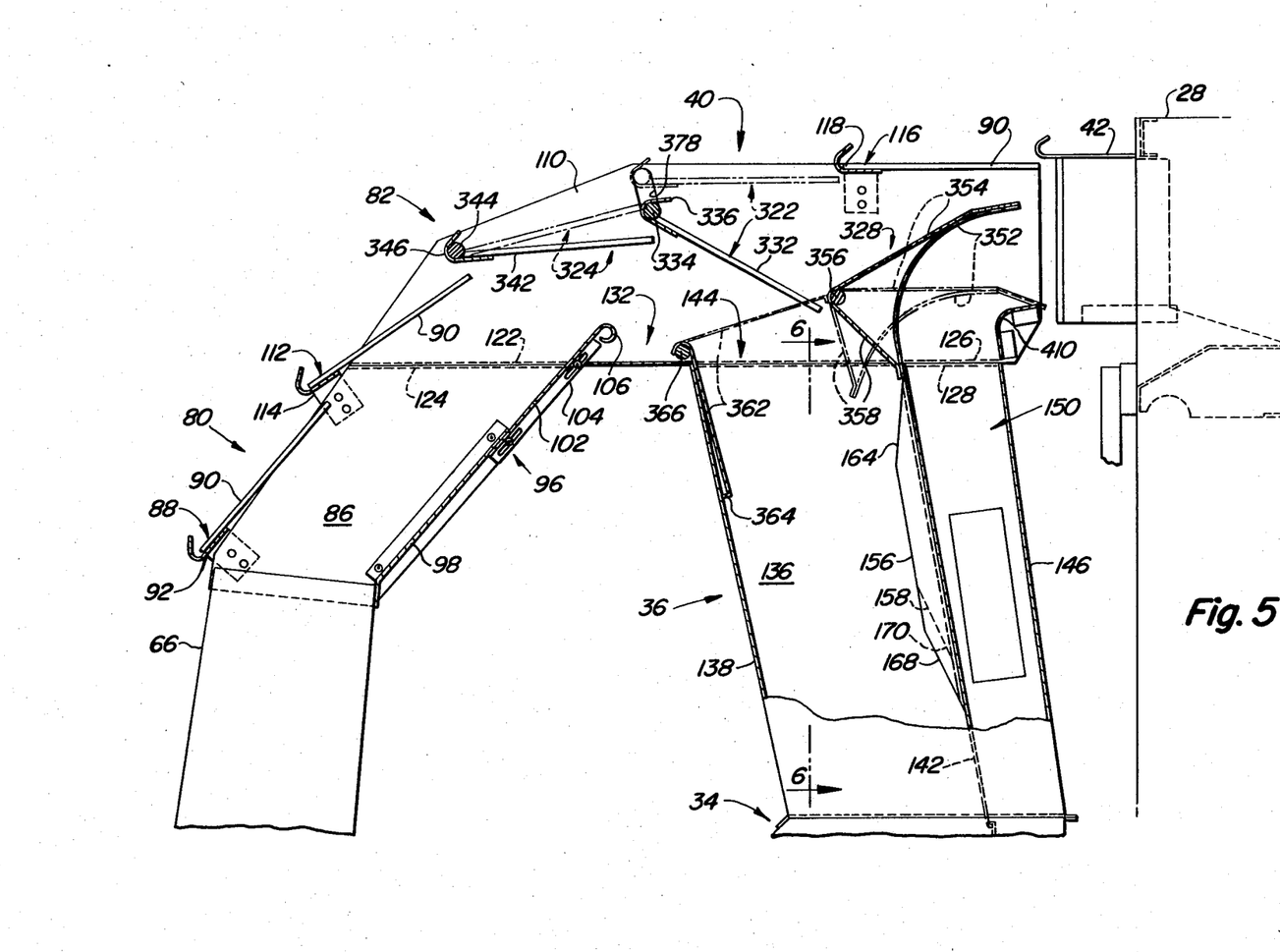
FIG. 5 is a view, partially in section, showing the upper portion of the cotton conveying duct and the cleaner inlet and outlet ducts and illustrating the positions of the grates and the doors in both the bypass mode (broken lines) and cleaning mode (solid lines) of operation.

The hood section 82 includes a pair of generally identical transversely spaced side hood sheets 110 fixed at their forward ends to the upper edges of the sidewalls 86 of the duct 80. The sheets 110 extend rearwardly terminating just forwardly of the receptacle input opening 42 (FIG. 5). The forward end of the hood section 82 is closed by a conventional fixed grate structure 112, generally identical to that described for the structure 88 and supported from the duct sidewalls 86 by bracket assemblies 114. The grate structure 112 is angled upwardly and rearwardly from the preceding grate structure 88 and imparts a more rearward direction to the flow of cotton through the conveying structure 26 while at the same time permitting additional trash and dirt to exit the structure between the grate fingers 90. A third fixed grate structure 116 is supported in generally horizontal fashion from the upper, rear portion of the side hood sheets 110 by brackets 118 adjacent the top portion of the input opening 42.

The forward portions of the side hood sheets 110 are flanged at 122, and the flanges 122 are connected to corresponding flanges 124 located on the upper edges of the sidewalls 86 of the duct 80. The aft ends of the side hood sheets 110 are flanged in a similar manner at 126 and are connected to corresponding flanges 128 which extend horizontally in the fore-and-aft direction at the upper end of the connecting ductwork 36. As best seen in FIG. 5, the hood section 82 remains open in the downward direction between the adjustable upper panel 102 of the panel structure 96 and the forward edge of the connecting ductwork 36 to form a green boll opening 132 which permits heavier material such as green bolls to fall from the conveying path before the material enters the connecting ductwork 36 or the receptacle input 42. The upper panel 102 can be moved upwardly or downwardly to optimize the selectivity of the conveying structure 26 in removing heavier bolls and debris from the upper portion of the cotton conveying path.

Figure 6:
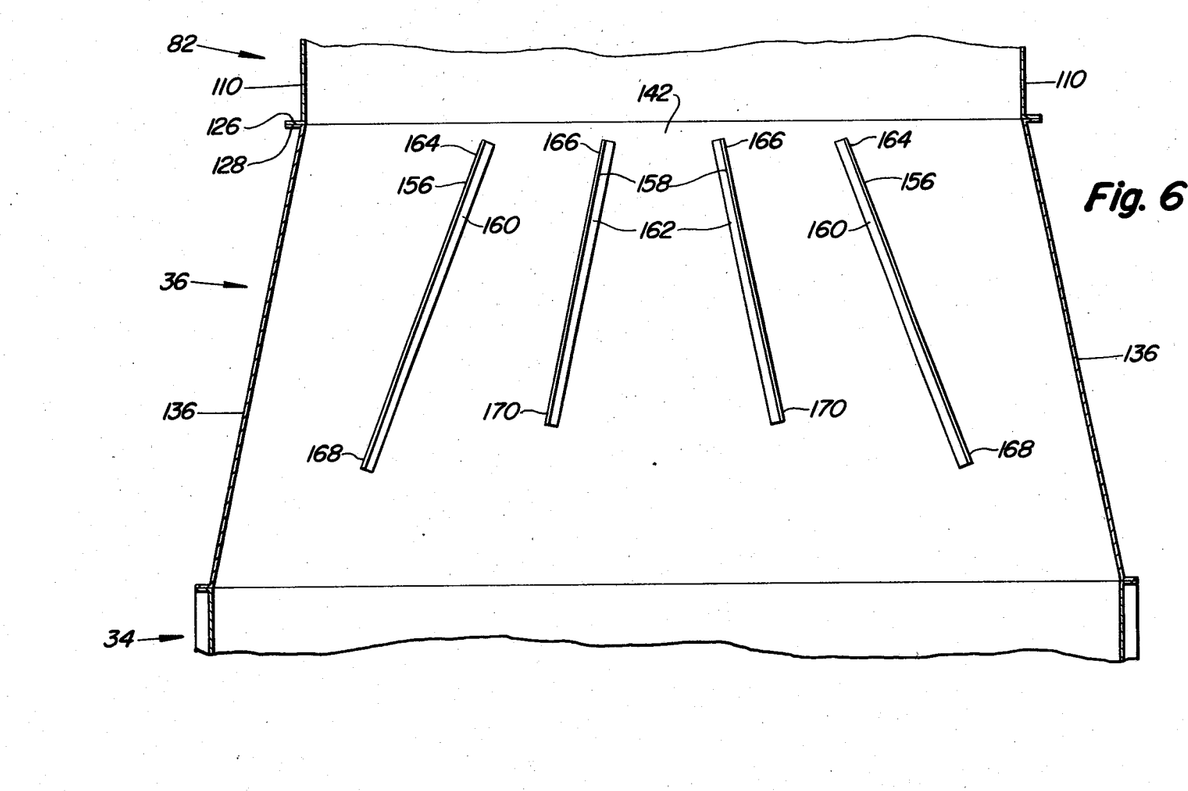
FIG. 6 is a view taken substantially along lines 6—6 of FIG. 5 and showing the locations of the deflecting fins on the rear inlet sheet of the cleaner inlet duct.

The widths of the grated upper connecting duct 80 and the hood section 82 are approximately equal to each other and to the width of the upper duct section 66 at location 72. However, as best seen in FIG. 6, the width of the cleaning machine 34 is substantially greater than the width of the hood section 82. The connecting ductwork 36 includes sidewalls 136 which diverge outwardly from the flanged connection to the sidewalls 110 of the hood section 82. A front inlet sheet 138 extends downwardly and rearwardly from the lower edge of the side hood sheets 110 to close the front portion of the connecting ductwork 36 between the sidewalls 136. A rear inlet sheet 142 extends downwardly and rearwardly from the side hood sheets 110 generally parallel to the front inlet sheet 138 and extends between the sidewalls 136 to define therewith an inlet duct 144. A rear outlet sheet 146 closes the aft end of the connecting ductwork 36 behind the sheet 142 and between the sidewalls 136 to define therewith an outlet discharge duct 150. As best seen in FIG. 5, the inlet duct 144 has a substantially larger fore-and-aft dimension than the outlet duct 150.

To provide a more uniform distribution of the cotton across the width of the cleaning machine 34 (FIG. 6), a plurality of deflecting fins 156, 158 are provided on the rear inlet sheet 142. The fins 156, 158 are fabricated from angles having flanges 160, 162 connected to the rear inlet sheet 142. As best seen in FIG. 6, the outermost fins 156 extend downwardly and diverge outwardly from a location adjacent the top of the connecting ductwork 36. The inner fins 158 diverge outwardly at an angle slightly less than that of the fins 156; and the fins 158 are slightly shorter than the fins 156. As best seen in FIG. 5, the fins are tapered at their upper ends at 164 and 166 and at their lower ends at 168 and 170. The height of the fins is very small compared to the fore-and-aft dimension (as viewed in FIG. 5) of the inlet duct 144. Cotton directed into the inlet duct 144 hits the top ends of the fins 156, 158 which impart direction to the cotton and cause it to spread as it drops downwardly toward the cleaning machine 34.

Figure 7:
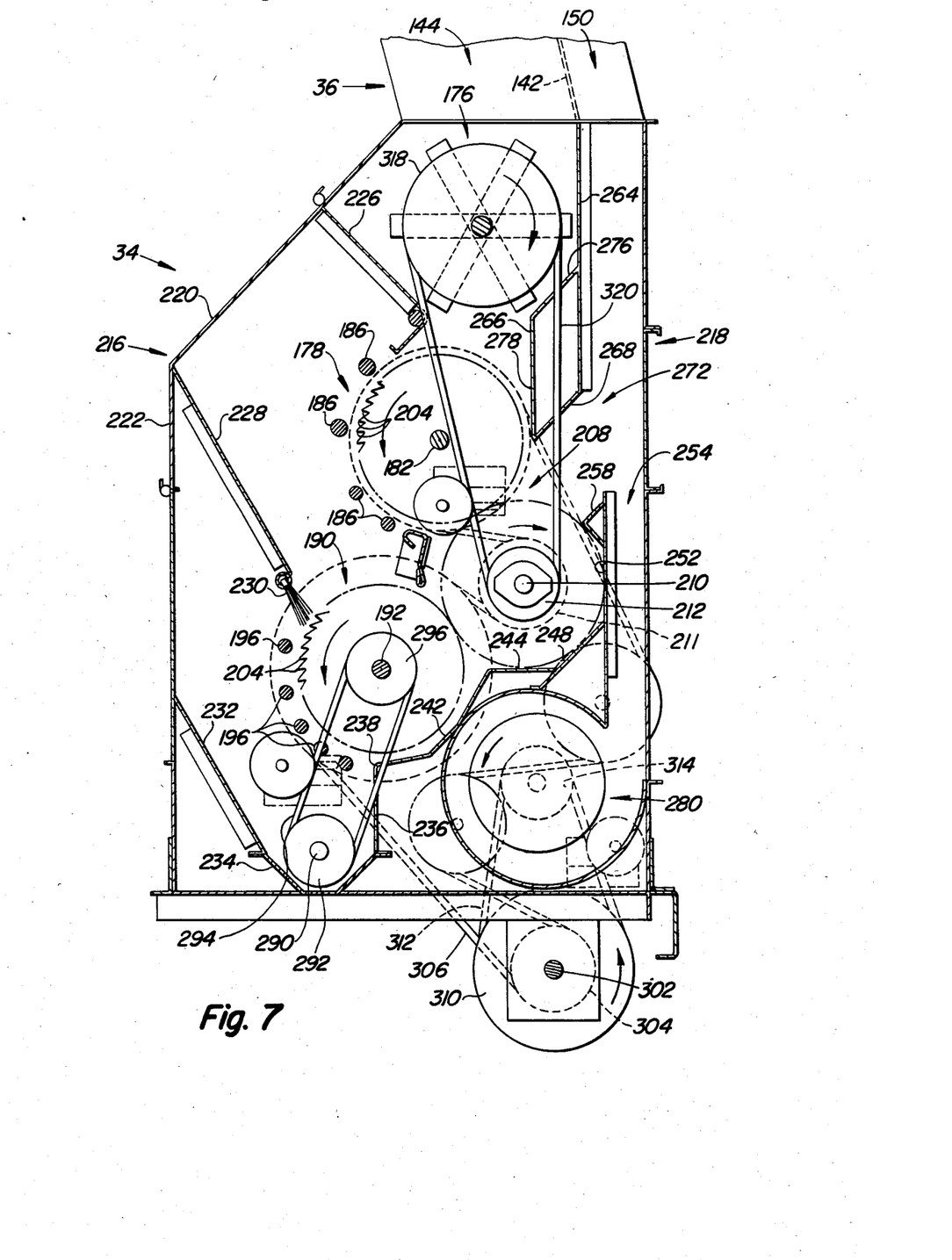
FIG. 7 is a left-hand side elevation of the cleaning machine of FIG. 1 partially broken away to illustrate the relative locations of the main cotton-cleaning components.
Figure 8:
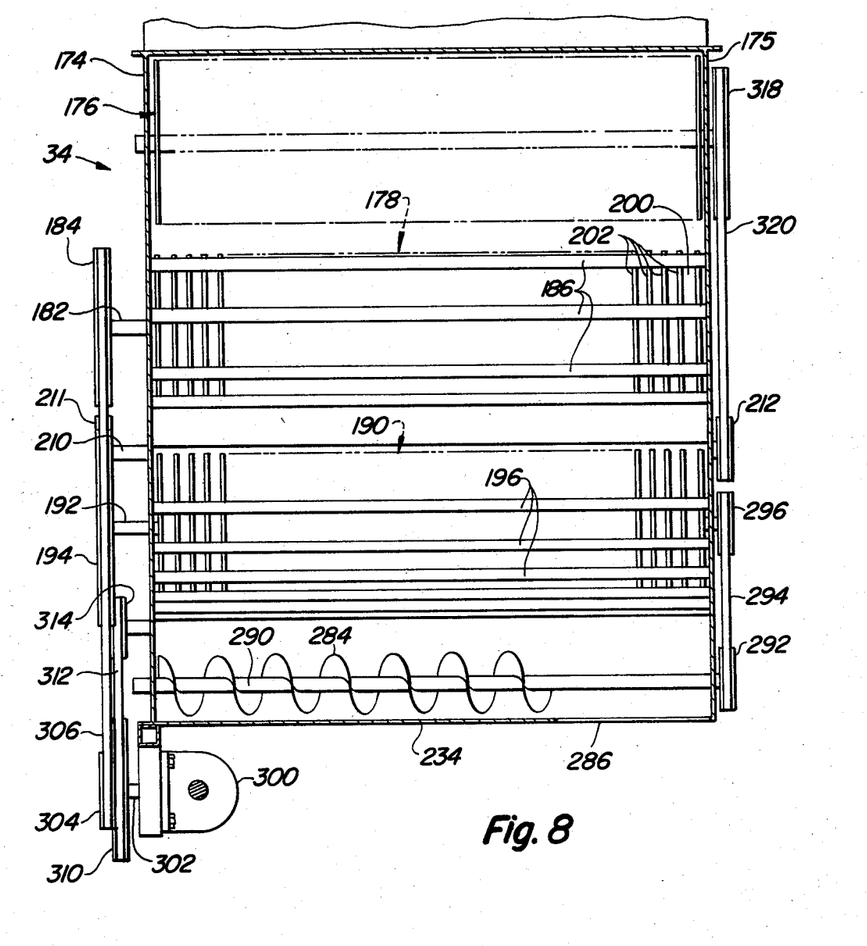
FIG. 8 is a front elevation of the cleaning machine of FIG. 7, partially broken away to more clearly show some of the internal elements.

The cleaning machine 34 is generally of conventional construction and includes upright sidewalls 174, 175 (FIGS. 7 and 8). An upper transverse feeder shaft 176 is located below the inlet duct 144. A primary saw cylinder 178 is located below the feeder shaft 176 and is mounted on a shaft 182 extending between the sidewalls 174, 175 and connected to a drive pulley 184. A series of grid bars 186 are supported between the sidewalls 174, 175 closely adjacent the forward portion of the saw cylinder 178. A reclaimer saw cylinder 190 is mounted on a shaft 192 for rotation between the sidewalls 174, 175 at a location below and slightly forward of the primary saw cylinder 178. A drive pulley 194 is connected to the shaft 192. A series of grid bars 196 extend between the sidewalls 174, 175 closely adjacent the forward portion of the reclaimer saw 190. The saw cylinders 178 and 190 are substantially identical in construction and each includes a drum 200 supporting a plurality of transversely spaced channel-shaped saw members 202 having saw teeth 204 with leading edges facing generally in the direction of rotation of the cylinder. A doffer 208 is supported on a shaft 210 mounted between the sidewalls 174, 175 for rotation in the clockwise direction (FIG. 7), closely adjacent both the primary and reclaimer saws 178 and 190, for stripping cotton from the teeth 204. Pulleys 211 and 212 are mounted on opposite ends of the shaft 210.

The cleaning machine 34 includes front panel structure 216 and rear panel structure 218 (FIG. 7) connected between the sidewalls 174, 175. The front panel structure 216 includes a downwardly and forwardly sloping upper panel 220 extending from the lower end of the connecting ductwork 36 to an upright forward wall 222. A sloped panel 226 extends downwardly and rearwardly from the panel 220 and terminates near the upper portion of the primary saw cylinder 178 to direct cotton from the feeder shaft 176 onto the top of the cylinder. A second sloped panel 228 extends from the juncture of the panels 220 and 222 downwardly and rearwardly toward the reclaimer saw cylinder 190. A brush 230 is connected to the lower edge of the panel 228 to brush cotton lint onto the teeth 204 of the reclaimer saw cylinder 190. A third sloped panel 232 extends downwardly from the panel 222 to a connection with the forward edge of an auger trough 234. The aft edge of the trough 234 is connected to an upright panel 236 which extends upwardly to a rounded bend location 238 closely adjacent the lower extremity of the reclaimer saw cylinder 190. Additional panel structure 242 extends upwardly and rearwardly from the bend location 238 closely adjacent the lower rear quadrant of the reclaimer cylinder 190 to a connection with a horizontal portion 244 which extends under the doffer 208. An inclined panel 248 extends upwardly and rearwardly from the horizontal portion 244 to a juncture with a vertical panel 252 which with the rear panel structure 218 defines a fan outlet duct 254 between the sidewalls 174, 175. A right angle panel 258 is connected to the upper end of the vertical panel 252 closely adjacent the upper rear portion of the doffer 208. An upright panel 264 is connected between the sidewalls 174, 175, and with the rear panel structure 218, defines the outlet discharge duct 150. A trapezoidal-shaped panel structure 266 extends forwardly and downwardly from the lower end of the upright panel 264 and includes a lower wall 268 defining with the right angle panel 258 a cleaned cotton outlet discharge area 272 opening into the outlet discharge duct 150 just above the fan outlet duct 254. The structure 266 also includes an upper panel 276 for directing cotton from the feeder shaft 176 toward the primary saw cylinder 178. A forward panel 278 terminates closely adjacent the cylinder 178 and prevents cotton from the feeder shaft 176 from directly entering the discharge area 272. A belt-driven fan 280 is located at the lower rear portion of the cleaning machine 34 and directs air through the fan outlet duct 254 upwardly into the outlet discharge duct 150. The air propells cotton doffed from the cylinders 178 and 190 upwardly from the discharge area 272 through the outlet discharge duct 150.

A belt-driven auger 284 (FIG. 8) is mounted between the sidewalls 174, 175 of the cleaning machine 34 for rotation in the trough 234. An opening 286 provided in the bottom of the trough 234 communicates with a trash chute 288 (FIG. 1) at the side of the main frame 12. The auger 284 includes a shaft 290, and a pulley 292 mounted on the shaft 290 is driven by a belt 294 which is trained around a pulley 296 mounted on the shaft 192 of the reclaimer saw cylinder 190.

The cleaning machine 34 includes a conventionally driven gear arrangement 300 with an output shaft 302 mounting a drive pulley 304. A belt 306 is trained around the pulley 304 and the pulleys 184 and 194 and the doffer drive pulley 211. A second drive pulley 310 is mounted on the output shaft 302, and a belt 312 is trained around the pulley 310 and around a fan drive pulley 314. A driven pulley 318 is fixed to one end of the feeder shaft 176 and a belt 320 is trained around the pulley 318 and around the pulley 212 fixed to the doffer drive shaft 210. Although the pulleys 292, 296 and 318, 212 and the respective belts 294 and 320 are shown on the right-hand side (FIG. 8) of the cleaner 34, they may be mounted on the opposite side of their respective shafts so that the drive components are at one convenient location.

Figure 2:
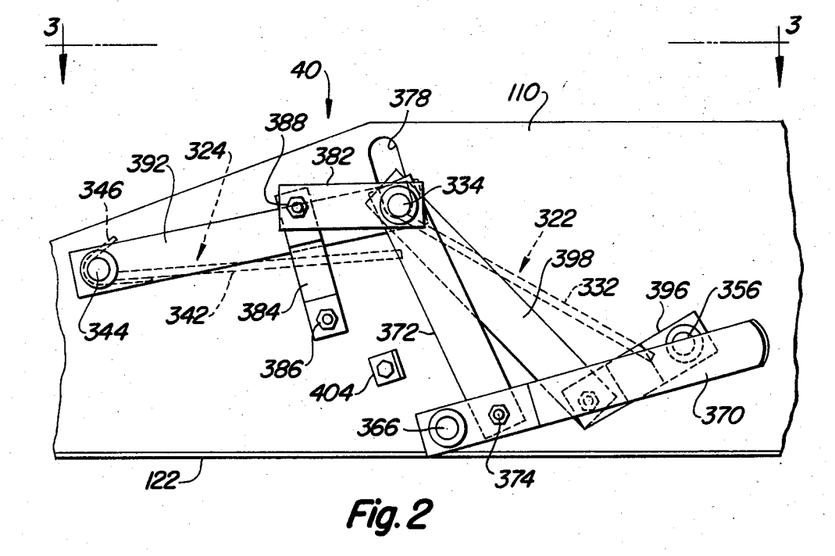
FIG. 2 is a left-hand side view of the grate and door control structure utilized with the harvester of FIG. 1 with the structure shown in the cleaning mode.

The grate and door control structure 40 is movable between a first position (see FIG. 2 and the solid lines in FIG. 5) for directing cotton from the connecting duct 80 into the inlet duct 144, and a second position (FIG. 4) wherein cotton is directed into the receptacle opening 42 completely bypassing the cleaning machine 34. The structure 40 includes a first movable grate 322 located forwardly of the fixed grate 116 and above the inlet duct 144. A second movable grate 324 is located directly ahead of and slightly below the first grate 322 and rearwardly of and above the fixed grate 112. A pivoting air door assembly 328 is located below the fixed grate 116, and above the outlet discharge duct 150 and the rear portion of the inlet duct 144. The grate 322 includes a plurality of conventional grate fingers 332 connected to a transversely extending and generally horizontal grate support shaft 334 by a grate holder 336. The grate 324 is likewise constructed of conventional grate fingers 342 fixed to a second grate shaft 344 by a grate holder 346. The grates 322 and 324 extend substantially the entire width of the hood section 82 between the side sheets 110.

The air door assembly 328 includes a rearwardly curved panel 352 connected adjacent its upper end to an upper deflector panel 354 which extends forwardly from the curved panel 352 to a connection with a transversely extending and generally horizontal door shaft 356. A lower deflector panel 358 extends upwardly and forwardly from the bottom portion of the curved panel 352 to a connection with the shaft 356.

A cleaner door sheet 362 having a stiffener end flange 364 is fixed to a door pivot shaft 366 adjacent the top of the sheet 138 of the inlet duct 144. The ends of the pivot shaft 366 extend through the side sheets 110 and the left-hand side (as viewed in the direction of travel) of the shaft is connected to a door control lever 370. The lever 370 is rockable from a first position (FIG. 2) wherein the cleaner door sheet 362 is rotated downwardly against the front inlet sheet 138 so that the inlet duct 144 is opened, and a second position (FIG. 4) wherein the sheet 362 generally closes the input to the inlet duct 144 (broken lines of FIG. 5). A control linkage 372 is connected to the door control lever 370 by a bolt 374 at a location offset slightly above the axis of the pivot shaft 366. The upper end of the control linkage 372 is apertured and the end of the shaft 334 extends through the aperture for support therein. The side sheet 110 is slotted at 378 so that as the lever 370 is rocked upwardly from the position shown in FIG. 2, the control linkage 372 moves upwardly and moves the grate shaft 334 upwardly in the slot 378. To control the attitude of the grate fingers 332, a grate pivot linkage 382 is rigidly connected at its aft end to the outermost end of the grate shaft 334. A grate anchor arm 384 is connected at its lower end to the side sheet 110 by a bolt 386 and extends upwardly and outwardly from the sheet to a bolt connection 388 with the forward end of the grate pivot linkage 382. As the door control lever 370 and control linkage 372 move the shaft 334 upwardly from the position shown in FIG. 2, the grate pivot linkage 382 rocks the shaft 334 in the counterclockwise direction (FIG. 4) to cause the grate fingers 322 to rock from a downwardly sloped position (solid lines in FIG. 5) to a generally horizontal position (broken lines) wherein the aft end of the grate 322 lies closely adjacent the forward end of the fixed grate 116.

Figure 3:
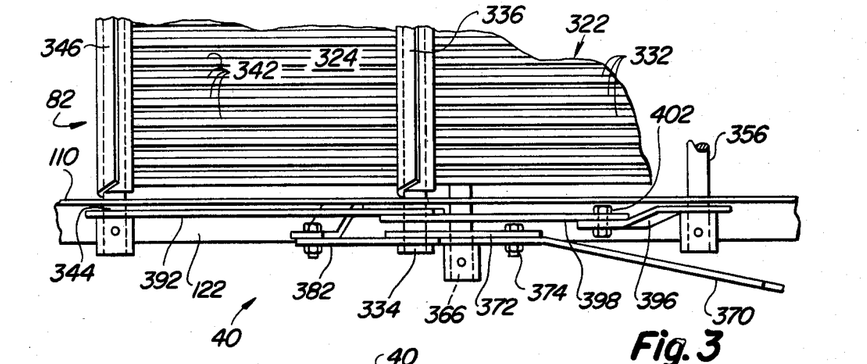
FIG. 3 is a view taken substantially along lines 3—3 of FIG. 2.

A grate control strap 392 is fixed at its forward end to the grate shaft 344 and at its aft end is connected for vertical movement with the grate shaft 334. As the shaft 334 moves up and down in the slot 378 with movement of the handle 370, the shaft 344 and therefore the second grate 324, rock also. With the lever 370 positioned in the cleaning mode (FIGS. 2 and 3) the grate fingers 342 extend only slightly upwardly from the rearwardly horizontal direction. As the handle 370 is rocked upwardly toward the bypass mode position (FIG. 4) the grate control strap 392 causes the shaft 344 to rock in the counterclockwise direction and move the fingers 342 slightly upwardly in the rearward direction.

To control the air door assembly 328, a cleaner door arm 396 is fixed at one end to the door shaft 356, and a door control strap 398 is connected at its lower end to the opposite end of the arm 396 by a bolt 402. The upper end of the strap 398 is connected to the shaft 334 for movement up and down with the shaft as it moves in the slot 378. Therefore, as the shaft 334 moves upwardly, the strap 398 moves the arm 396 upwardly to rock the door shaft 356 in the clockwise direction to cause the door 328 to move to the bypass position (broken lines in FIG. 5). Movement of the lever 370 to the cleaning mode position (FIG. 2) causes the door control strap 398 to move downwardly with the shaft 334 and rock the cleaner door arm 396 and the shaft 356 in the counterclockwise direction to the cleaning mode position as shown by the solid lines in FIG. 5.

The shafts 334, 344, 356 and 366 extend through the right-hand side sheet 110 (not shown) and are connected by linkage structure (not shown) which is generally identical to that described above with the exception of the door control lever 370 which on the right-hand side does not require an elongated grip extension upwardly beyond the bolt 374. Therefore, the right-hand side linkage structure will not be described in detail here.

Figure 4:
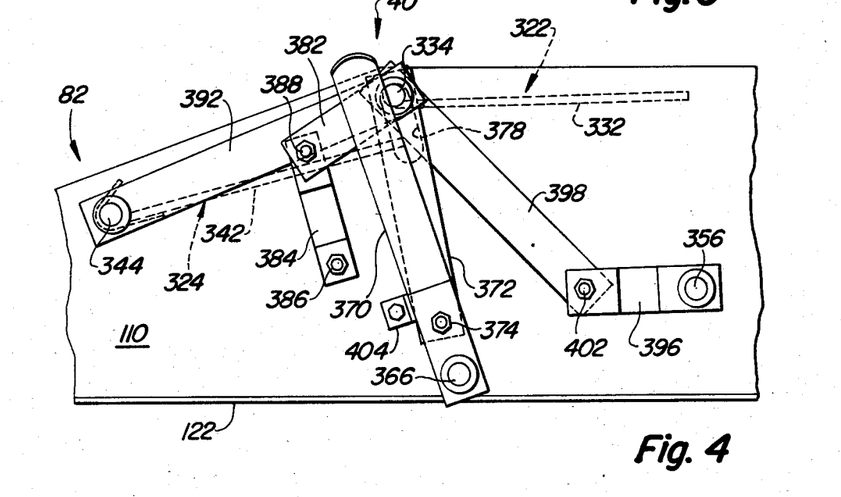
FIG. 4 is a view similar to the view shown in FIG. 2, but with the control structure positioned for operation in the bypass mode wherein cotton is conveyed directly to the receptacle without entering the cleaning machine.

A stop bracket 404 is connected to the side sheet 110 for contacting the door control lever 370 when the lever is moved to the bypass mode position (FIG. 4). The stop bracket 404 is positioned so that contact is made when the lever 370 is moved to a position slightly beyond the over-center position, that is, when the pivotal connection at 374 is rotated in the counterclockwise direction beyond the line intersecting the axes of the shafts 334 and 366.

In operation, the stripper row units 22 strip cotton and some trash from the rows of cotton, and the cotton and trash is conveyed by the cross auger 44 toward the lower duct portion 48. A jet of air from the air nozzle and duct assembly 56 is blown upwardly in the air induction chamber 54 and causes the cotton and trash to be drawn upwardly into the chamber and propelled through the duct section 66 toward the grated upper connecting duct 80. The structures 78 and 79 on the upwardly opening nozzle 58 cause the air to be directed toward the front portion of the upper duct section 66 and provide uniform spreading of the cotton across the width of the outwardly diverging upper duct section 66. The air bleed door 62 is adjusted to cause some of the heavier trash such as green cotton bolls to fall out the open bottom 51 of the separation duct 50. The fixed grate structure 88 located at the top of the upper duct section 66 begins to divert the conveyed material slightly rearwardly while permitting finer trash and dirt to pass directly out of the conveying system between the grate fingers 90. The adjacent fixed grate structure 112 imparts a more rearward direction to the material and also permits more trash to exit the conveying system between the grate fingers 90. The conveyed material enters the hood section 82, and the movable grate 324 imparts a more rearward direction to the conveyed material. Again, trash and dirt are permitted to exit through the grate 324. Below the location of the movable grate 324, heavier trash such as green bolls that were not separated at the lower end of the conveying structure 26 will drop downwardly, and much of the heavy trash will exit through the green boll opening 132. The upper panel 102 is adjusted to provide a properly sized opening 132 to assure that some of the heavy trash is separated from the remainder of the conveyed material without losing a substantial portion of the desired cotton crop. By dropping the green bolls through the opening 132, plugging of the cleaning machine 34 is reduced.

Assuming that the operator has adjusted the lever 370 to the cleaning mode position (FIGS. 2 and 3 and the solid lines of FIG. 5), the grate 322 is rotated downwardly so that the end of the grate fingers 332 are located close to the door shaft 356. The door shaft 356 is rotated in the counterclockwise direction so that the lower deflector panel 358 abuts against the rear inlet sheet 142 of the inlet duct 144. The curved panel 352 extends the forward surface of the outlet discharge duct 150 upwardly and rearwardly towards the receptacle opening 42. The deflector panel 354 is angled upwardly from the door shaft 356 towards the aft end of the fixed grate 116. Cotton and trash are directed towards the inlet duct 144 by the movable grates 324 and 322. Trash which is able to pass between the grate fingers 332 of the grate 322 passes upwardly through the open top of the hood section 82 and through the fixed grate 116. The deflector panel 354 deflects much of the trash that passes through the movable grate 322 upwardly through the grate 116 so that the trash does not get conveyed through the opening 42 and into the basket 28. Cotton and the remaining trash are directed downwardly and rearwardly into the inlet duct 144 by the grate 322. Much of the conveyed material impinges against the fins 156, 158 and is caused to spread across the width of the cleaning machine 34. The feeder shaft 176 directs the spread cotton and trash onto the primary saw cylinder 178. Cotton is lodged on the teeth 204, and the trash is impacted against the grid bars 186 and drops downwardly toward the reclaimer saw cylinder 190. The cotton is doffed from the teeth 204 by the doffer 208 and is directed into the discharge area 272 and upwardly into the outlet discharge duct 150. The brush 230 brushes lint cotton onto the teeth of the reclaimer saw cylinder 190, and trash is separated from the cotton as it rotates with the cylinder against the grid bars 196. The doffer 208 also removes the cotton from the teeth of the reclaimer cylinder 190 and directs it into the discharge area 272. Trash falls down into the auger trough 234 and is conveyed toward the left-hand side of the machine and out the trash chute 288. Cleaned cotton is directed upwardly in the discharge duct 150 and impinges against the curved panel 352 which directs the cotton into the cotton receptacle opening 42.

To bypass the cleaning machine 34, the operator moves the control lever 370 to the bypass mode position (FIG. 4) which raises the grate shaft 334 and rotates the grate 322 to a generally horizontal position directly behind the fixed grate 116. At the same time, the movable grate 324 rotates in a counterclockwise direction, and the cleaner door sheet 362 rotates in the counterclockwise direction to a position closely adjacent the door shaft 356 to close off the input to the inlet duct 144. Simultaneously, the door shaft 356 rotates in the clockwise direction to move the air door assembly 328 so that the curved panel 352 abuts against a curved cleaner discharge bottom sheet 410. The top panel 354 now extends generally horizontally. The conveyed material passes over the cleaner door sheet 362 and over the panel 354 into the opening 42, with the finer trash passing out of the movable grates 322 and 324 and the fixed grate 116. Ladder structure 412 is provided on the left-hand side of the cleaning machine 34 for convenient access to the grate and door control structure 40.

Having described the preferred embodiment, it will be apparent that modifications can be made without departing from the scope of the invention as defined in the accompanying claims.

I claim:

1. In a conveying system for harvested cotton having trash content, a duct section for conveying cotton, a cleaning machine having an input duct for receiving cotton and trash and an output duct for conveying cleaned cotton from the machine, a cotton receptacle, movable cotton-diverting structure located adjacent the duct section and movable between a first position wherein cotton from the duct section is directed into the input duct of the cleaning machine and a second position wherein the cotton is directed into the receptacle, said diverting structure including a movable grate for diverting the cotton into the cleaner input duct while permitting trash to pass through the grate when the diverting structure is in the first position, and a deflector sheet movable with the grate for directing trash passed through the grate away from the receptacle.

2. The invention as set forth in claim 1 wherein the deflector sheet is located adjacent the cleaning machine output duct and is movable to an output duct blocking position when the diverting structure is moved to the second position.

3. The invention as set forth in claim 1 wherein the width of the duct section is substantially less than the width of the input duct, said input duct including fin structure for uniformly distributing the cotton across the width of the input duct when the diverting structure is in the first position.

4. The invention as set forth in claim 1 wherein the duct section is elongated and extends substantially in an upward direction; a fixed trash separating grate located adjacent the upper end of the duct and angled rearwardly with respect to the axis of the duct section; wherein the movable grate is located rearwardly of the fixed grate and in the first position directs cotton substantially in a rearward direction and in the second position directs cotton downwardly to the input duct; an upper grate located adjacent the receptacle above the deflector sheet and forward of the movable grate in the path of the passed trash directed away from the receptacle by the deflector sheet.

5. The invention as set forth in claim 4 wherein the diverting structure includes a second movable grate located between the fixed grate and the first-mentioned movable grate, and control linkage means operably connecting the movable grates and deflecting sheet for operation in unison.

6. The invention as set forth in claim 5 wherein the movable grates are pivotable about respective horizontal axes, and including means for moving at least one of the horizontal axes vertically with respect to the cleaner input duct as the diverting structure is moved between the first and second positions.

7. The invention as set forth in claim 4 including a green boll opening located upstream of the input duct, below the first movable grate, and an adjustable panel structure for selectively adjusting the location of the upstream edge of the opening.

8. The invention as set forth in claim 6 wherein the first movable grate, when the diverting structure is in the second position, is generally horizontal and generally aligned with the upper grate, and wherein the horizontal axis of said first movable grate is movable downwardly toward the cleaner input duct as the diverting structure is moved from the second position toward the first position.

9. The invention as set forth in claim 6 further including a door located adjacent the input duct and operably connected to the control linkage means for closing the input duct to conveyed cotton when the diverting structure is in the second position.

10. The invention as set forth in claim 2 including a curved panel connected to the deflector sheet and positioned adjacent the output cleaner duct, when the diverting structure is in the first position, for directing cleaned cotton into the receptacle.

11. The invention as set forth in claim 10 including a forward panel connected to the curved panel and deflector sheet and movable therewith to define the upper rear boundary of the input duct when the diverting structure is in the first position.

12. The invention as set forth in claim 11 including cotton-diverting fin structure supported in the input duct, wherein, when the diverting structure is in the first position, the forward panel is located directly above and closely adjacent said fin structure.

13. The invention as set forth in claim 11 including pivot means supporting the deflector sheet for rocking about a generally horizontal axis above the input duct, wherein when the diverting structure is in the first position, the movable grate extends downwardly to a location closely adjacent the pivot and the forward panel extends downwardly and rearwardly from the pivot.

14. The invention as set forth in claim 13 further including door structure connected to the input duct and means for rocking the door structure across the input duct and in general alignment with the deflector sheet as the diverting structure is moved towards the second position.

15. In a cotton harvester having row harvesting units for removing cotton and some trash from rows of cotton plants, a basket, an upwardly directed walled air duct having a lower inlet for receiving cotton and trash and an upper outlet located adjacent the basket, a cleaner cabinet supported generally below the duct output and including at least one elongated and horizontally extending cleaner adapted for receiving cotton and trash from the duct and removing trash from the cotton, means selectively directing the cotton and trash from the duct to the cabinet for uniformly distributing the cotton and trash along the width of the cleaner, comprising:

a downwardly directed conduit having an upper end opening upwardly adjacent the outlet end of the duct and a lower end connected to the cleaner cabinet, said lower end having a width generally equal to and extending in the same direction as the width of the cleaner, said conduit including panel structure closing the downstream end of the conduit and defining the rear portion of the cotton conveying path, fin structure supported on the panel structure in the cotton path for intercepting a portion of the conveyed cotton, said fin structure diverging in the downward direction for spreading the cotton uniformly across the width of the cleaner.

16. The invention as set forth in claim 15 including movable trash separating grate structure located adjacent the conduit, and means for moving the grate structure between a first downwardly directed position wherein cotton is directed into the upper opening and a second rearwardly directed position wherein the cotton is directed over the opening toward the basket.

17. The invention as set forth in claim 16 wherein, when the grate is in the first position, trash passes through the grate, said invention further comprising a movable panel and means for moving the panel into the path of the passed trash, when the grate structure is moved to the first position, to divert the passed trash away from the basket.

18. The invention as set forth in claim 17 including an outlet duct connecting the cleaner with the basket for conveying cleaned cotton to the basket, and a discharge deflector sheet connected for movement with the panel for directing cotton from the cleaner output duct into the basket when the grate structure is in the first position.

19. The invention as set forth in claim 16 including pivot means connecting the grate structure for rocking about a horizontal axis, and means for raising and lowering the pivot means as the grate structure is moved between the first and second positions.

20. The invention as set forth in claim 15 including means defining a downwardly directed green boll opening, having leading and trailing boundaries between the air duct outlet and conduit opening for permitting dense trash and green bolls to drop from the cotton conveying path, and means for adjusting the location of at least one of the boundaries of the green boll opening.

21. The invention as set forth in claim 15 wherein the fin structure comprises narrow strips projecting into the cotton path, the upper portions of the strips tapering into the path and imparting direction to the intercepted cotton.

22. The invention as set forth in claim 15 wherein the air duct includes an outwardly diverging upper duct section, and means for uniformly distributing the conveyed cotton and trash across the width of the diverging section, said means for distributing comprising an upwardly directed air nozzle supported within the duct below the diverging section and adjacent one of the walls of the duct, and air diverting means for directing air from the nozzle toward said one of the walls.

23. The invention as set forth in claim 22 wherein the diverging upper duct section at least doubles in width in the upward direction.

24. The invention as set forth in claim 23 wherein the diverging upper duct section decreases in size, in the direction extending horizontally perpendicular to the width, as the section diverges.

25. The invention as set forth in claim 24 wherein the duct section narrows in said perpendicular direction by at least 20 percent.

26. In a mobile cotton harvester having a fore-and-aft extending main frame supported for forward movement over a field with parallel rows of cotton plants, a fore-and-aft extending receptacle supported at the aft end of the frame, a harvesting head assembly supported at the forward end of the main frame including means for conveying cotton and debris removed from the plants to a central location; air-conveying structure connected to the head assembly for moving the removed material upwardly and rearwardly toward the receptacle, said structure including an upper generally horizontal duct extending rearwardly to the forward end of the receptacle; a cleaning machine having an inlet and outlet and supported on the main frame behind the head assembly and ahead of the receptacle below the horizontal duct;

connecting ductwork extending upwardly from the cleaning machine inlet toward the horizontal duct; a first movable grate located above the connecting ductwork and movable between a first position wherein the grate extends downwardly and rearwardly from a location adjacent the top of the horizontal duct towards the connecting ductwork to direct cotton into said connecting ductwork while permitting trash to pass rearwardly through the grate, and a second position wherein the grate extends horizontally adjacent the top of the horizontal duct to permit conveyed material to flow into the receptacle; a second movable grate located forwardly of said first grate and movable between first and second positions, wherein in the first position the second grate imparts a downward and rearward component of travel to the conveyed material, and in the second position, said second grate is angled more rearwardly than in the first position to impart a more rearward component of travel to direct conveyed material toward the receptacle; and grate control means for selectively moving the first and second grates together to their respective first and second positions.

27. The invention as set forth in claim 26 including a movable door assembly located above the cleaning machine outlet and including a deflecting panel, and means moving the door assembly to a first position, when the grates are moved to the first position, wherein the deflecting panel is located above the cleaning machine outlet to deflect cotton from said outlet towards the receptacle, and to a second position, when the grates are moved to the second position, wherein the door assembly blocks the outlet to conveyed material in the horizontal duct.

28. The invention as set forth in claim 26 wherein the door assembly is located rearwardly adjacent the first movable grate and includes trash diverting structure for diverting trash which passes rearwardly through the first grate away from the receptacle when the grates and door assembly are in their respective first positions.

29. The invention as set forth in claim 28 further including a fixed grate located above the door assembly adjacent the aft end of the horizontal duct in the path of said diverted trash.

30. The invention as set forth in claim 26 including a movable door located above the cleaner input, and means for moving the door to close the cleaner input to conveyed material when the grates are moved towards their respective second positions.

31. The invention as set forth in claim 26 wherein the cleaning machine includes a transversely extending cleaning cylinder having a width substantially greater than the width of the horizontal duct; and means for dispersing the conveyed material across the width of the cleaning cylinder when the grates are in the first positions, said means for dispersing comprising vane structure connected to the connecting ductwork and diverging transversely in the downward direction.

32. The invention as set forth in claim 31 wherein the vane structure includes narrow fins extending forwardly from the aft portion of the connecting ductwork, said fins having a fore-and-aft dimension substantially less than the fore-and-aft dimension of the connecting ductwork.

33. The invention as set forth in claim 26 including an adjustable opening located generally below the first grate and adjacently upstream of the connecting ductwork for permitting heavy trash to exit the conveying structure before reaching the connecting ductwork.

* * * * *